UNITED STATES PATENT OFFICE.

GEORGE PAGE, OF KEENE, NEW HAMPSHIRE.

SPIRAL BIT WITH COUNTERSINK FOR SETTING SCREWS.

Specification of Letters Patent No. 82, dated November 17, 1836.

*To all whom it may concern:*

Be it known that I, GEORGE PAGE, of Keene, in the county of Cheshire and State of New Hampshire, have invented a new and useful machine or tool called the "spiral bit," with countersink for setting screws, and that the following is a full and exact description of the construction and operation of the said machine or tool as invented by me.

The use of the spiral bit with countersink, for setting screws is at one operation to bore a hole into wood to receive the screw, which hole shall be of different sizes, one part fitting the body, and the other the thread of the screw intended to be set, and to countersink the wood, or metal to receive the head of the screw. The lower or small end is made like that of the common spiral gimlet, but less tapering, and the length of the part so made should be the same as that of the thread of the screw. The part just above (the length of which part should be the same as that of the body of the screw) is made like a twist bit with lips, or cutters where the two parts are united like those of a common auger. These cutters projecting a little, make a hole larger than the part below. Above this second part the tool to form a countersink, swells to the size of the head of the screw. Through this swell a hole is made, and cutting edges are formed by filing sharp two sides of the hole diagonally opposite to each other. These edges are rounded the middle projecting forward a little, when the tool is intended to be used to countersink holes in metal, spiral teeth should be filed upon the swell, no hole being made through it. The size, and length of the tool, and of various parts of it, should be according to the size, and length of the screw to be set, and the various parts of it. The shank may be either like that of a gimlet or bit, and the handle may be like that of a gimlet, or the shank may be used in a common bit stock.

I claim as my invention—

The countersink at the upper end of the bit part in the shape first above described, and the combination of the spiral gimlet; the twist bit, and countersink in one tool.

GEORGE PAGE.

Witnesses:
T. W. EDWARDS,
JOHN HATCH.